United States Patent [19]

Killian et al.

[11] Patent Number: 4,886,408

[45] Date of Patent: Dec. 12, 1989

[54] BOWED EXTERNAL SPRING RETAINING RING OF THE E-SHAPED TYPE

[75] Inventors: Edmund F. Killian, Merrick; Wallace H. Berliner, Woodside, both of N.Y.

[73] Assignee: Waldes Truarc, Inc., Long Island City, N.Y.

[21] Appl. No.: 239,467

[22] Filed: Sep. 1, 1988

Related U.S. Application Data

[60] Continuation of Ser. No. 888,468, Jul. 23, 1986, Pat. No. 4,798,075, which is a division of Ser. No. 650,662, Sep. 14, 1984, abandoned.

[51] Int. Cl.$^4$ .......................... F16B 2/24; F16B 21/10
[52] U.S. Cl. .................................... 411/519; 411/522
[58] Field of Search ............... 411/353, 517, 518, 519, 411/522, 523, 530

[56] References Cited

U.S. PATENT DOCUMENTS

| | | | |
|---|---|---|---|
| 2,078,453 | 4/1937 | Miller | 411/517 |
| 2,544,631 | 3/1951 | Heimann et al. | 411/518 |
| 2,686,687 | 8/1954 | Singleton | 411/522 |
| 3,178,987 | 4/1965 | Reese et al. | 411/523 |
| 3,297,916 | 1/1967 | Wright | 411/522 |
| 3,319,508 | 5/1967 | McCormick | 411/517 |
| 3,438,664 | 4/1969 | Meyer | 411/520 |
| 3,442,171 | 5/1969 | Engelmann | 411/517 |

FOREIGN PATENT DOCUMENTS

| | | | |
|---|---|---|---|
| 400397 | 10/1933 | United Kingdom | 411/517 |
| 660746 | 11/1951 | United Kingdom | 411/519 |

Primary Examiner—Daniel C. Crane
Attorney, Agent, or Firm—Eugene E. Renz, Jr.

[57] ABSTRACT

A bowed external spring retaining ring of the E-shaped type includes flats at the leading and trailing ends of the ring. The flats form leading and trailing edges of the ring which are rounded on a concave side of the ring. The ring is formed by a punch which has an end face comprised of a concave portion and straight portions, the latter forming the flats on the ring.

1 Claim, 2 Drawing Sheets

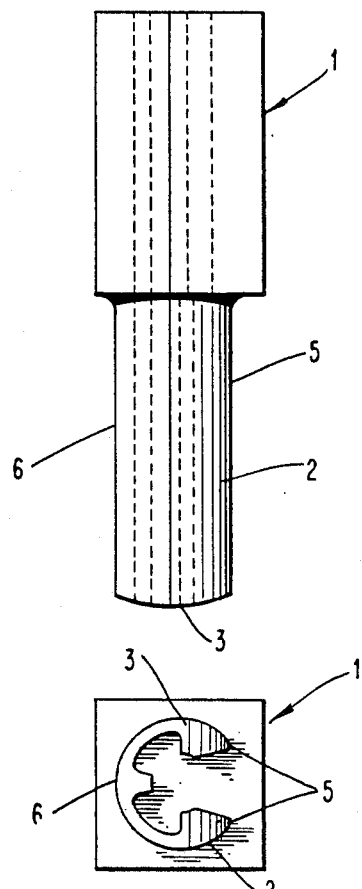
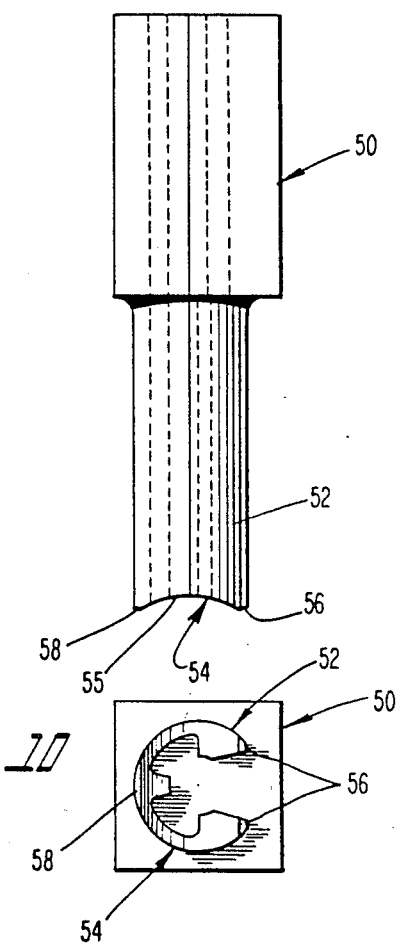
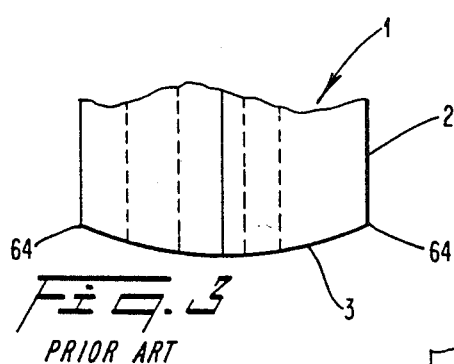
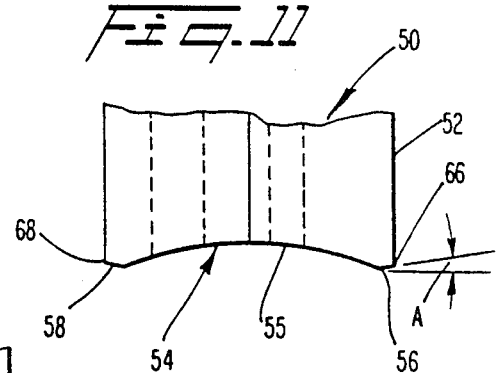
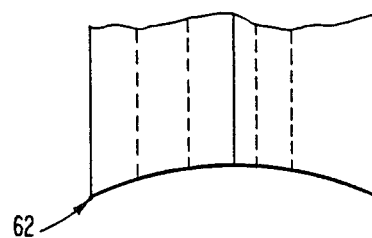

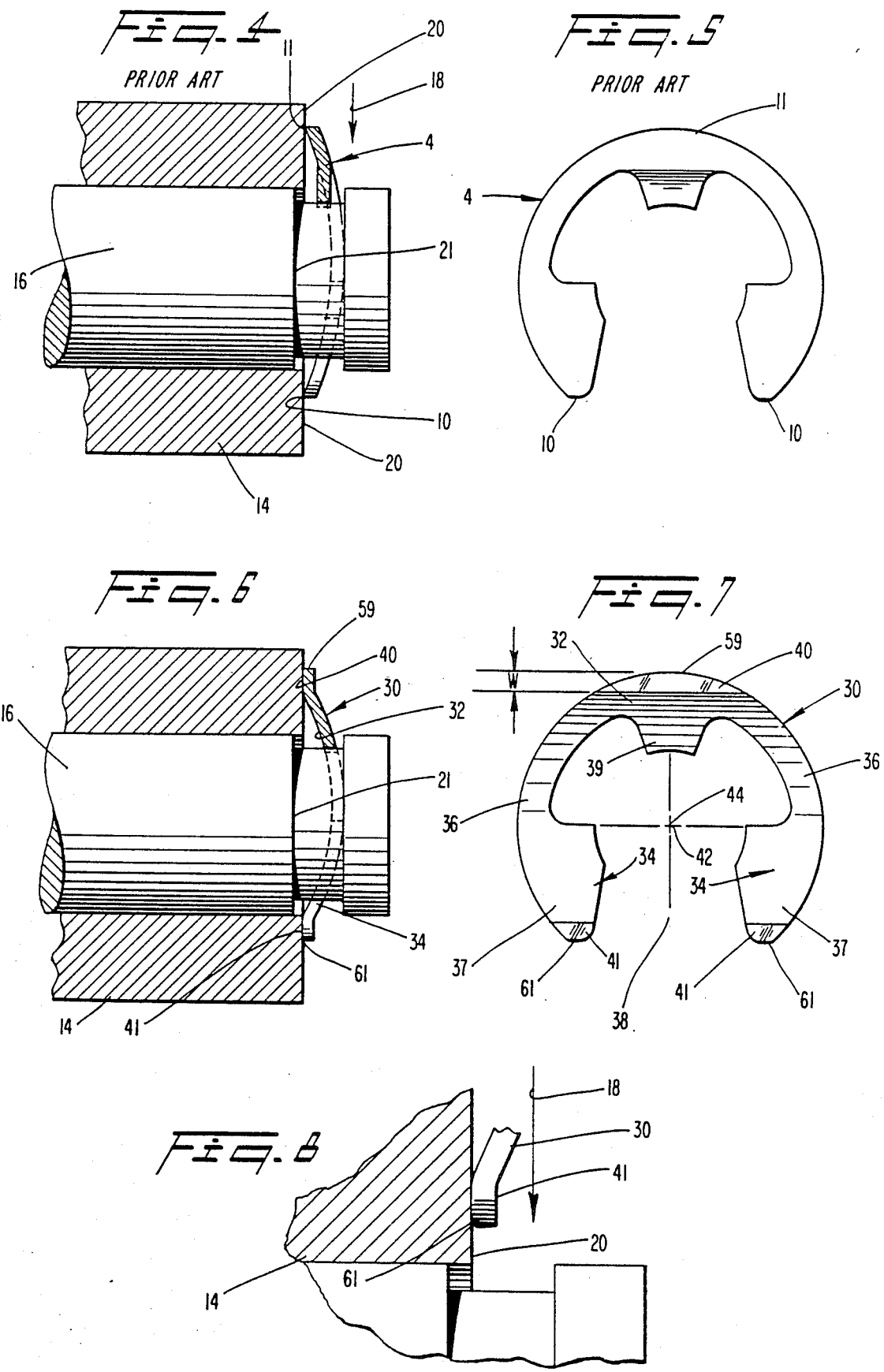

BOWED EXTERNAL SPRING RETAINING RING OF THE E-SHAPED TYPE

BACKGROUND AND OBJECTS OF THE INVENTION

This is a continuation of application Ser. No. 888,468 filed Jul. 23, 1986, now U.S. Pat. No. 4,798,075, which is a divisional of 650,662 filed Sept. 14, 1984, abandoned.

The present invention relates to a bowed, external, spring retaining ring and to a method of making same.

Machines, tools and numerous other types of structures and equipment include separate components which are to be secured in place. Use is often made of spring retaining rings which are mounted in one component to form an artificial stop shoulder in the path of the other component or retained part. Retaining rings can be of various types. One type of retaining ring is a so-called "bowed" ring which is of non-planar (non-flat) profile (e.g., see U.S. Pat. No. 2,487,802). Such a bowed ring is yieldable resiliently in an axial direction and thus is highly suited for taking up end play caused by component wear and/or tolerances in groove location or dimensions of the components, and also to dampen vibrations and oscillations, among other uses. In addition, bowed rings maintain a tight grip radially against the bottom of the groove.

Bowed retaining rings can be of the "internal" or "external" type. An internal ring is specifically configured and dimensioned so that its outer periphery fits into a circular internal groove of one component and its inner or bowed periphery lies in the path of the retained part to be capable of making contact with the latter. Thus, an internal bowed ring engages the retained part with its convex side.

An external ring is specifically configured and dimensioned so that its inner periphery fits into a circular external groove of one component and its outer periphery lies in the path of the retained part to be capable of making contact with the latter. Thus, an external bowed ring engages the retained part with its concave side (FIG. 4).

Bowed external spring rings can be of various configurations, such as a so-called E-ring which includes a middle prong. The middle prong projects radially inwardly from the middle section of the ring. Installation of such an E-ring is performed in the radial direction, i.e., by sliding the ring radially into the groove.

Bowed external retaining rings can be formed by various techniques, including punching. A punching operation which has heretofore been employed involves the use of a punch 1 of the type depicted in FIGS. 1–3. That punch has a shank 2 formed in the shape of the ring. The end 3 of the shank is convexly curved in a configuration corresponding to the bowed curvature to be formed in the ring. One characteristic of rings 4 (FIG. 5) formed in that manner is that the leading edge 10 and trailing edge 11 of the concave side of the ring (FIG. 4) are sharp. That is, an edge of the ring formed by contact of leading and trailing edges 5, 6 of the punch with the metal blank is sharp in nature, due to the known, inherent characteristics of a punching operation. Since the concave side of the ring faces the retained part 14, the sharp edges 10, 11 may tend to dig into that part not only after the ring has been installed, but during installation as well. That is, a bowed external ring of E-shape is installed in a radial direction 18 whereby the leading edge 10 of the ring concave side slides along the surface 20 of the retained part 14 and tends to dig into such surface 20, and also possibly into a surface 21 of the groove of the other component 16. Such scoring is especially prevalent in the case of components formed of a relatively soft material such as aluminum for example. Scoring of a component can produce serious problems, such as the creation of burrs and/or loose bits of metal which may interfere with proper operation.

In bowed rings which are not of an E-shape and which are installed in an axial direction, rather than a radial direction, the existence of a sharp leading edge on the ring does not pose the problem discussed above.

Disadvantages associated with sharp ring edges have been noted for example in British Patent No. 660,746 published Nov. 14, 1951. In FIGS. 5–6 of that patent a bowed external spring retaining ring of the E-shape type is disclosed in which the leading and trailing ends of the ring have been flattened in order to reduce contact of sharp edges with the retained part. While there is no disclosure in that British patent of the exact manner in which the rings are to be formed, the ring formation results in the creation of sharp edges on the concave side of the ring, the disadvantages of which are to be reduced by the provision of the flats. It appears that while the provision of flats at the leading and trailing ends of the ring may diminish to some extent the scoring problem, the problem is not completely eliminated especially during the installation of the ring in which a sharp leading edge, even when disposed on a flattened portion of the ring, will tend to score the retained part.

Of course, the rings can be machined after fabrication and prior to installation in order to smooth-out the sharp edges, but such a procedure is highly impractical from time and economical standpoints.

It is further noted that the flattening of the trailing end of the ring in the British patent is achieved to such an extent that even the middle prong of the ring is flattened. Flattening of the ring to that extent will considerably reduce the length of the bowed portion and thus will unduly stiffen the ring and adversely affect its performance.

It is, therefore, an object of the present invention to minimize or obviate problems of the type discussed above.

Another object is to provide a bowed external spring retaining ring of the E-shaped type which does not present a sharp leading edge along the concave side of the ring and which is not excessively stiff.

A further object is to provide an inexpensive method of manufacturing such rings whereby at least the leading edge of the ring along the concave side of the ring is rounded.

An additional object is to provide such a method which involves punch-forming and wherein the rounding of leading edge is achieved inherently by the punching operation itself.

SUMMARY OF THE INVENTION

These objects are achieved by the present invention which relates to a punching method of forming a bowed external spring retaining ring of the E-shaped type. The method comprises the punching of a blank by means of a punch having an end face which comprises a concave portion and straight portions. The concave portion forms a bowed segment of the ring, and the straight portions form leading and trailing edges of the ring, whereby the leading end and trailing edges of the concave side of the ring are rounded.

A further aspect of the present invention involves a punch for forming a bowed external spring retaining ring of the E-shaped type. The punch comprises a shank formed identically to the ring and having an end face. The end face includes a concave portion which forms a bowed segment of the ring, and straight portions projecting from leading and trailing edges of the bowed portion to form leading and trailing edges, respectively, of the ring. Preferably, the straight portions of the punch extend rearwardly from the leading and trailing edges of the bowed portion.

A further aspect of the present invention involves a bowed external spring retaining ring of the E-shaped type. The spring comprises a middle section, a pair of end sections, and a pair of intermediate sections interconnecting the middle and end sections. A middle prong projects generally radially inwardly from the middle section. The intermediate sections are bowed about an imaginary transverse line to define concav and convex sides of the ring. The end sections are flat. A radially outer portion of the middle section is flat and coplanar with the flat end sections. The flat outer portion of the middle section terminates short of the middle prong. The end sections have rounded leading edges of the concave side of the ring. Preferably, the flat portion of the middle section has a rounded trailing edge on the concave side of the ring.

THE DRAWINGS

The objects and advantages of the invention will become apparent from the following detailed description of preferred embodiments thereof in connection with the accompanying drawings in which like numerals designate like elements, and in which:

FIG. 1 is a side elevational view of a prior art punch employed in the fabrication of prior art bowed, external spring retaining rings of the E-shaped type;

FIG. 2 is a front end view of the punch depicted in FIG. 1;

FIG. 3 is an enlarged, fragmentary side elevational view of the end of the punch depicted in FIG. 1;

FIG. 4 is a longitudinal sectional view taken through a piece of equipment containing a prior art mode external spring retaining ring of the E-shaped type;

FIG. 5 is a front view of a prior art bowed external spring retaining ring of the E-shaped type;

FIG. 6 is a longitudinal sectional view taken through a piece of equipment containing a bowed external spring retaining ring of the E-shaped type according to the present invention;

FIG. 7 is a front view of the novel bowed external spring retaining ring of the E-shaped type according to the present invention;

FIG. 8 is an enlarged fragmentary view of a portion of the piece of equipment depicted in FIG. 6, and depicts a leading edge of the ring according to the present invention as the ring is being installed;

FIG. 9 is a side elevational view of a punch for forming the novel bowed external spring retaining ring of the E-shaped type according to the present invention;

FIG. 10 is a front end view of the punch depicted in FIG. 9;

FIG. 11 is an enlarged fragmentary view of a portion of the front end of the punch depicted in FIG. 9; and FIG. 12 is an enlarged fragmentary side elevational view of a front end of a hypothetical punch which would be unsatisfactory for commercial use.

DETAILED DESCRIPTION OF PREFERRED EMBODIMENTS OF THE INVENTION

A bowed internal spring retaining ring 30 in accordance with the present invention is depicted in FIG. 7. The ring 30 comprises an open-ended spring steel ring which includes a middle section 32, a pair of end sections 34, and a pair of intermediate sections 36 which interconnect the end sections 34 with the middle section 32. The end sections 34 each include lugs or ears 37 which are spaced apart to define as opening 38 located opposite the middle section 32.

Projecting radially inwardly from the middle section 32 is a middle prong 39. Flats 40, 41 are formed in the middle section 32 and the end sections 34 to define the trailing and leading ends of the ring in relation to the direction of installation 18. The flats 40, 41 are mutually coplanar.

The ring 30 is symmetrically bowed about an imaginary transverse line 42 which extends transversely of the ring's longitudinal axis 44 and is situated between the middle section 32 and the opening 38. Preferably, the ring is bowed to conform to the outer periphery of an imaginary cylinder of a fixed radius as explained in more detail in the afore-mentioned U.S. Pat. No. 2,487,802, the disclosure of which is incorporated herein by reference.

The ring is fabricated by a punching operation. A punch 50 for that purpose is depicted in FIGS. 9–11. The punch includes a shank 52 shaped in the manner of the ring. The end face 54 of the shank includes a portion 55 which is bowed concavely, and portions, 56, 58 of the punch forming the leading and trailing ends of the ring are straight, and are preferably inclined away from the end of the punch by a slight angle A, the size of which angle depending upon the spring characteristics of the blank material. As the punch traverses a blank formed of spring material, e.g., spring steel, the bowed portion 55 of the end face 54 forms the bowed portion of the ring, and the straight portions 56, 58 of the face 54 form the flats in the middle and end sections of the ring. The purpose for the angling of the straight portions 56, 58 at A is to compensate for a tendency of the ring flats 40, 41 to spring back after being formed. This assures that all of the flats are coplanar.

Importantly, the flat 40 in the middle section 32 is of insufficient width W to excessively stiffen the ring. In that regard, the flat 40 preferably terminates short of the middle prong 39.

The bowed portion 55 of the punch face 54 engages that surface of the blank (not shown) which is to define the convex side of the ring. That means that the opposite side of the blank, i.e., the side forming the concave side of the ring, will be rounded at the locations forming the ring trailing and leading edges 59, 61. This is a known characteristic in the art of punching, i.e., the side of a punched-out article which is engaged by the punch has sharp edges, whereas the opposite side of the article has relatively rounded corners. The provision of a concave face 55 on a punch to form the prior art ring of FIG. 5 would be avoided in the ring-making art, even if proposed, because the intersection of the outer periphery of such concave face with the side surface of the punch shank would, as is depicted in FIG. 12, create very sharp leading and trailing edges 60, 62 on the punch, i.e., angles less than ninety degrees, which would wear out so soon as to be commercially impracticable. That is, sharp edges on punches are to be avoided for that reason. On the other hand, the provision of a convex face 3 on the punch, as depicted in FIG. 3, creates somewhat blunt edges 64 on the punch, whereby the life of the punch will be relatively long. All bowed ring punches of which the present inventors are aware have possessed a convex end face.

In accordance with the present invention, however, the presence of the straight portions 56, 58 at the leading and trailing edges of the end face 54 of the punch 50 eliminate the occurrence of sharp edges on the punch (i.e., less than ninety degrees). Accordingly, bowed rings with rounded leading and trailing edges on the ring concave side are formed inherently during the punching step. This is achieved, moreover, by means of a punch which exhibits a sufficient life to be commercially practicable, since relatively blunt edges 66, 68 are relatively long-lived.

The rounding of the leading edge 61 on the concave side of the ring 30 produces the significant advantage that no problematic scoring of the surface 20 of the retained part 14 occurs even during installation of the ring, as is made evident in FIG. 8. Furthermore, the flats themselves facilitates installation of the ring by preventing the ring from becoming skewed as it is being inserted.

IN PRACTICE, a bowed external spring retaining ring 30 is formed by means of the punch 50 in which the concave portion 55 and straight portions 56, 58 of the punch end face 54 form a bowed ring having flats 40, 41 at its leading and trailing ends and wherein the leading and trailing edges 61, 59 on the concave side of the ring are relatively rounded.

The rounding of those edges, especially the leading edges 61, minimizes any tendency for the ring to score the components during installation and subsequent operation.

The above-noted advantages are achieved economically because the ring shape is achieved inherently during the punching step per se.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A bowed external spring retaining ring of the E-shape type of generally U-shaped cross-section and symmetrically bowed about a line transverse to its longitudinal axis; comprising:

a spring steel ring having a discontinuous circumference thereby forming an open ended ring including:

a middle section (32), a pair of end sections (34), a pair of intermediate sections (36) interconnecting said middle and end sections; and the end sections (34) each including lugs (37) spaced apart to define an opening (38) located opposite the middle section (32), and a middle prong (39) projecting generally radially inwardly from said middle section (32), with said middle prong (39) and middle section (32) having a combined radial width, said intermediate sections (36) having radial widths each less than the radial width of the lugs (37) and less than the combined radial width of the middle prong (39) and the middle section (32), flats (40, 41) formed in the middle section (32) and the end sections (34) to define the trailing and leading ends of the ring, the flats (40, 41) being mutually coplanar, said flat (40) adjacent said prong (39) terminating short of said prong and being of a radial width less than the combined radial width of the middle section (32) and prong (39)

said intermediate sections, said prong and a part of said lugs being bowed about an imaginary transverse line to define concave and convex sides of said ring, said transverse line extending transverse to the longitudinal axis of said ring, said end sections having rounded leading edges on said concave side of said ring.

* * * * *